Patented Feb. 16, 1932

1,844,969

UNITED STATES PATENT OFFICE

JOSEPH W. MEADOWCROFT, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA

WELDING FLUX

No Drawing.   Application filed November 15, 1929.  Serial No. 407,582.

This invention relates to autogenous welding and more particularly to the autogenous welding of aluminum, duralumin and the like metals.

One of the features of the invention is an improved flux and method of preparing the same and by means of which flux the autogenous welding of aluminum, duralumin and the like may be conducted simply, economically and efficiently.

A further feature of the invention relates to the use of the particular flux as an improved medium in a method of welding.

One of the objects of this invention is to provide a flux of such nature and character which, when properly prepared, may be easily, readily and efficiently applied as a coating to a filler material or body, and which will adhere closely to such material and permit the filler body to be handled freely without material damage to the flux coating, and to be stored indefinitely without change in or impairment of the efficiency of the flux material.

A further object is to provide a flux of the nature referred to which, when applied to and properly dried on a filler body, will not readily absorb moisture.

A further feature of the invention relates to the particular procedure by which chemicals of which the flux is to be composed are ground together until a certain condition is reached, after which they are further ground in combination with water into a consistency of light cream.

Other features of the invention are described and claimed in the following specification and claims.

This application has been divided from and is a continuation in part of my copending application Serial No. 685,731, filed January 12, 1924, entitled Autogenous welding. In that application was described and claimed a method of welding and also a welding rod consisting of a filler body coated with a thin coating of flux. The present invention relates particularly to details by which it was possible to produce the improved welding rod and procedure of welding as described in Serial No. 685,731.

Many efforts have been directed toward the problem of welding together aluminum or duralumin members but the methods heretofore proposed have not been satisfactory, and moreover they have been inefficient and slow, and hence expensive. In this improved method of welding outlined in Serial No. 685,731 a filler body of suitable size and shape is coated with a thin coating of a flux composition of the character and nature provided for by the present invention. This flux composition which has proved suitable as a coating for such filler elements and which in practice has proved efficient, consists of the following ingredients in approximately the proportions stated, the proportions given being illustrative, and not to be regarded as limitations, and being based on the weight per pound of the flux composition to be produced:

| | Per cent |
|---|---|
| Potassium carbonate | 3.00 |
| Potassium chloride | 3.70 |
| Lithium chloride | 6.90 |
| Potassium sulphate | 7.20 |
| Borax | 20.00 |
| Boracic acid | 21.00 |
| Sodium carbonate | 38.20 |

The ingredients of the flux composition are mixed together and the mixture reduced to a condition which enables it to freely mix with water so as to be brought to approximately the consistency of light cream, and it is then ready to be applied to the filler body. In preparing the flux I have found it convenient and satisfactory to grind the mixed ingredients for a sufficient length of time to reduce the mixture to a condition of smoothness. This may be accomplished by grinding the mixture in a rolling ball mill grinder or rumbler for a number of hours, say, for example, from fifteen to twenty hours, more or less, or by repeatedly grinding the mixture through a paint mixer. When the mixture has been reduced by the grinding operation to a degree of smoothness which permits it to mix freely with water, a sufficient quantity of water is added during a continuation of the grinding operation to bring the mixture to approximately the consistency of light cream. When brought to this condition of smoothness and consistency, it is ready to be applied to the filler body, and when such body, composed of aluminum, or duralumin, or like metal, is properly prepared and cleaned and then dipped into the flux composition, the latter will adhere closely to the filler body, and will not readily absorb moisture, nor will it be materially impaired by handling of the coated filler body, nor by lapse of time after application and before using the filler body coated therewith. It will be noticed that I have not used in the combination of materials utilized for coating the filler body, any binder such for instance as is commonly employed, as the several ingredients are sufficient in themselves to give proper adherence to the filler body and adhere tenaciously to said filler body without the addition of any non-weld-assisting binder.

For a filler body I have found it convenient and satisfactory to employ aluminum, or duralumin, and such body may be in the form of a rod, or it may be sheared or cut from a sheet of the metal stock, or scrap shearings from press blanks or shear trimmings may be employed. The filler body, whether in the form of a cast rod, or a strip of sheet or scrap material or shearing, may be of any desired size, shape or dimension. I have found in practice that it is efficient and satisfactory to employ a strip from a sheet or shearing or scrap of aluminum having a thickness of from .010 inch to .5 inch in thickness and a width ranging from one sixteenth inch to one inch.

I have found it desirable to cleanse the filler body before applying the flux composition coating thereto. This is especially necessary in the case of use of scrap material from press blanks, shearings, or the like, in order to remove any neutral or other oil that is usually applied to sheet metal in blanking and shearing operations. This cleansing of the filler body can be easily and efficiently accomplished with kerosene, gasolene, alcohol, benzol, or other hydrocarbon.

Before applying the flux coating to the filler body, I have found it desirable to reduce the surface of the filler body to a condition which will permit or enable the flux composition to take an immediate hold on such surface. To accomplish this I have found that it is convenient and efficient to dip the filler body, after it has been cleansed, as above described, where cleansing is required, into a hot solution of 15% caustic soda (lye) and water for about a minute, more or less, and then subjecting the body to a bath of clear cold water. This treatment serves to impart a bright finish to the surface of the strip to permit the flux composition to adhere at once to such surface when applied thereto, and to be indefinitely retained thereon.

After the filler body and flux composition have been prepared, as above described, the flux may be applied to the body in any suitable or convenient manner. I have found in practice that it is sufficient and efficient to dip the body into the flux composition. After dipping, the coating is dried by any suitable means. I have found it satisfactory to employ a cold air blast for this purpose. I have found in practice that by utilizing some or all of the materials mentioned in the coating solution and bringing the same to the consistency of light cream, or substantially so, I obtain when the filler bodies are dipped either singly or otherwise into the solution a coating which is absolutely uniform throughout the surface of the body and is of sufficient thickness to overcome any irregularities in the absorptive power of the surface of the metal and which is not of sufficient thickness to produce an objectionable slag deposit in welding.

The filler body prepared and coated in the manner above described is now ready for use in effecting the autogenous welding together of aluminum, duralumin, or the like metal parts, by the employment of an oxy-acetylene or an oxy-hydrogen flame. In effecting the welding operation, the operator is free to carry on his work without successive interruptions, thereby greatly increasing the speed. I have found that an increase in speed of approximately forty per cent is realized. By employing scrap material for the filler body a saving of approximately eighty per cent is effected, and there is no waste of the flux composition. In the actual use of this method of welding not only is the speed of the welding operation and, hence, the production, very greatly increased, but the production costs are lowered to the extent of approximately sixty per cent as compared with other methods of welding heretofore employed.

I claim:

1. A composition of matter suitable for the coating of welding rods used in the autogenous welding of aluminum and the like, consisting of the following materials and in the following proportions by weight:

| | Per cent |
|---|---|
| Potassium carbonate | 3.00 |
| Potassium chloride | 3.70 |
| Lithium chloride | 6.90 |
| Potassium sulphate | 7.20 |
| Borax | 20.00 |
| Boracic acid | 21.00 |
| Sodium carbonate | 38.20 |

2. A composition of matter suitable for the coating of welding rods used in the autogenous welding of aluminum and the like, said composition consistsing of the following materials and in the following proportions by weight:

|  | Per cent |
|---|---|
| Potassium carbonate | 3.00 |
| Potassium chloride | 3.70 |
| Lithium chloride | 6.90 |
| Potassium sulphate | 7.20 |
| Borax | 20.00 |
| Boracic acid | 21.00 |
| Sodium carbonate | 38.20 | said ingredients being in physical combination with water and the consistency of light cream, said light cream being capable of adhering to a filler body when dried and of serving as a flux without forming weld preventing slag.

In testimony whereof I hereunto affix my signature.

JOSEPH W. MEADOWCROFT.